US00RE37050E

(19) United States
(12) Reissued Patent
Hennington

(10) Patent Number: US RE37,050 E
(45) Date of Reissued Patent: Feb. 13, 2001

(54) CLAMP FOR USE WITH ELECTROPLATING APPARATUS AND METHOD OF USING THE SAME

(75) Inventor: Paul Hennington, New Territories (HK)

(73) Assignee: Process Automation International Limited, Bethlehem, CT (US)

(21) Appl. No.: 09/223,247

(22) Filed: Dec. 30, 1998

Related U.S. Patent Documents

Reissue of:
(64) Patent No.: 5,589,051
Issued: Dec. 31, 1996
Appl. No.: 08/353,197
Filed: Dec. 9, 1994

(30) Foreign Application Priority Data

Dec. 10, 1993 (GB) ..... 9325297

(51) Int. Cl.[7] ..... C25D 5/00; C25D 17/06; C25D 17/08

(52) U.S. Cl. ..... 205/80; 204/242; 204/279; 204/297 R; 204/297 W; 204/DIG. 7; 269/87.1

(58) Field of Search ..... 204/279, 297 R, 204/297 W, DIG. 7, 242; 205/134, 80; 269/87.1

(56) References Cited

U.S. PATENT DOCUMENTS

| | | | |
|---|---|---|---|
| 2,101,178 | 12/1937 | Hogaboom et al. | 204/297 R |
| 2,859,166 | 11/1958 | Grigger | 204/279 |
| 3,090,823 | 5/1963 | Roach | 136/82 |
| 3,821,097 | 6/1974 | Ettel | 204/106 |
| 3,862,891 | 1/1975 | Smith | 204/279 |
| 3,939,915 | 2/1976 | Wood | 269/87.1 |
| 3,970,540 | 7/1976 | McBain | 204/297 W |
| 4,085,997 | 4/1978 | Hainsworth | 204/297 W |
| 4,113,586 | 9/1978 | Cook | 204/105 R |
| 4,844,779 | 7/1989 | Callahan | 204/279 |
| 4,879,007 | 11/1989 | Wong | 204/225 |
| 5,152,881 | 10/1992 | Sim | 204/297 R |
| 5,391,276 | 2/1995 | Astor et al. | 204/DIG. 7 |

FOREIGN PATENT DOCUMENTS

| | | |
|---|---|---|
| 667675A5 | 12/1978 | (CH) . |
| 4243252A1 | 7/1993 | (DE) . |
| 2246790 | 10/1990 | (GB) . |
| WO91/13190 | 9/1991 | (WO) . |

*Primary Examiner*—Donald R. Valentine
(74) *Attorney, Agent, or Firm*—St. Onge Steward Johnston & Reens LLC

(57) ABSTRACT

A clamp for use in an electrolytic plating bath is disclosed. The clamp comprises [two levers] *at least two opposing levers, at least one lever being* pivotally attached to [each other at] a fulcrum wherein the clamp, when floating on top of a liquid, is in an open position but when submerged is caused, by virtue of its buoyancy, to move to a closed position. Each lever comprises a first part integrally attached to a second part. The first part and the second part are situated on opposite sides of the fulcrum from each other such that rotational movement about the fulcrum between the open position and the closed position causes the second parts of each lever to move from an upper position to a lower position. In operation, at least one substrate is supported in a substantially vertical plane for submersion into an electrolyte bath. The substrate is positioned over the electrolyte bath and then is submersed into it. The clamp clamps the substrate at its lower edge as the substrate enters the electrolyte bath.

23 Claims, 8 Drawing Sheets

CLAMP FOR USE WITH ELECTROPLATING APPARATUS AND METHOD OF USING THE SAME

Matter enclosed in heavy brackets [ ] appears in the original patent but forms no part of this reissue specification; matter printed in italics indicates the additions made by reissue.

This invention relates to a clamp.

In particular this invention relates to a buoyancy activated clamp.

In addition this invention relates to a cathode shield, electroplating apparatus and method using a clamping means.

Known clamps are not very [sutiable] *suitable* for use in automated processes.

In U.S. Pat. No. 4,879,007 (to the same assignee, and incorporated in this specification by reference) a means for increasing the efficiency and speed of automated electroplating is described. Substrates to be electroplated are automatically clamped at the top and brought in to be suspended over an electrolyte bath. The substrates are then lowered into the bath, at which time their lower edges contact a cathode shield device floating on the top of the bath. The weight of the substrates and the pressure bearing down upon them is sufficient to overcome the buoyancy of the shield and to move it down into the electrolyte bath. Flexible substrates, however, even if they are able to bear down enough on the cathode shield to push it into the bath, tend to warp and wobble, creating an uneven pattern of electroplating on the substrate. This problem is usually over come by placing around the perimeter of flexible substrates, a rigid frame. This solution has a number of drawbacks: firstly, the substrates usually must be loaded by hand; secondly, the frame gets coated with metal as well, which metal must then be scraped off; and thirdly, in view of the above drawbacks, the electroplating process is rather slow.

The object of the present invention is to overcome the above disadvantages or difficulties or at least to provide public with a useful choice.

Accordingly, in a first embodiment this invention consists in a clamp comprising two levers pivotally attached to each other at a fulcrum wherein the clamp, when floating on top of a liquid, is in a first position but when submerged, by virtue of its buoyancy is caused to move to a second position.

In a second embodiment, the present invention consists in a method for the electrolytic deposition of a coating of metal on an electroplatable substrate as cathode in an electrolyte bath equipped with anode wherein the substrate is supported in a substantially vertical plane and is automatically clamped at its lower edge as it enters the electrolyte bath.

In a third embodiment, the present invention consists in a cathode shielding device for use in an electrolytic plating bath, said device comprising: an elongated trough adapted to be inserted in said bath; said trough being provided with a plurality of clamps comprising two levers pivotally attached to each other at a fulcrum wherein the clamp, when floating on top of a liquid, is in a first position but when submerged, by virtue of its buoyancy is caused to move to a second position; said clamps being aligned substantially in parallel vertical planes transverse to the longitudinal axis of said trough, for securing one or more electroplatable substrates in a substantially vertical plane with the lower edge of each of said substrates located below the plane in which lies the upper edges of said trough; and said trough having a plurality of perforations in the upper region of the sides thereof.

In a fourth embodiment, the present invention consists in an apparatus for electrolytic deposition of metal on a substrate comprising a container for electrolyte; a cathode bus bar; and a clamping means, wherein an electroplatable substrate is attachable at an upper edge to the cathode bus bar and the clamping means clamps lower edge of any substrate attached to the cathode bus bar as the substrate enters the container.

Preferred embodiments of the invention will now be described with reference to the drawings in which.

Figure 1:
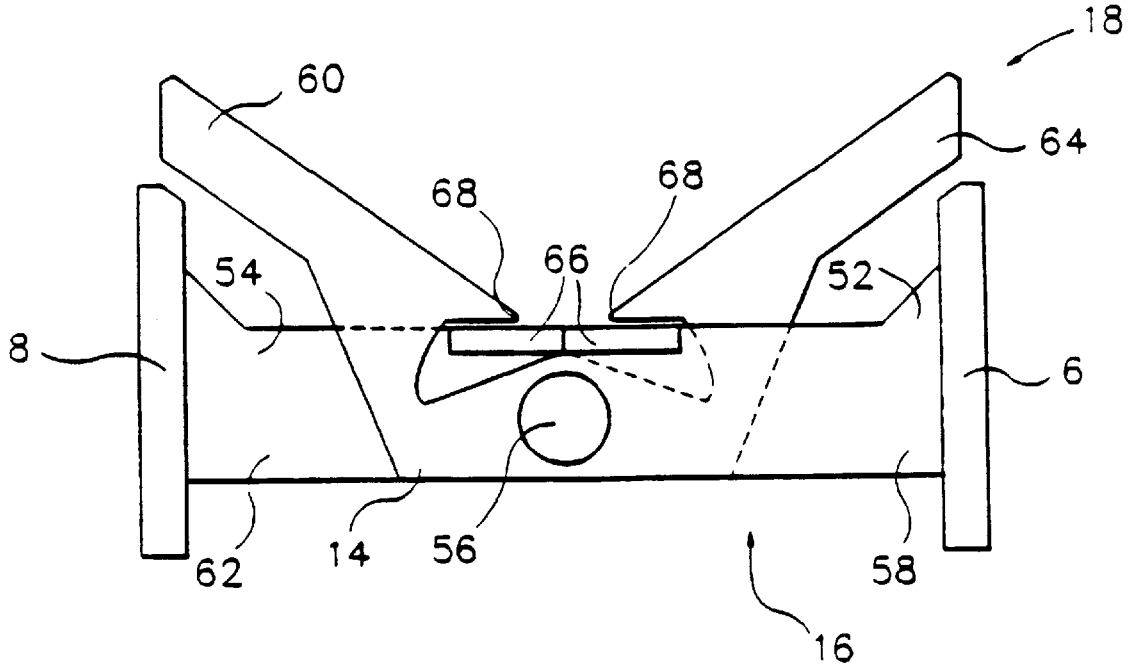
FIG. 1 is a schematic side view of the clamp of the present invention in a closed position.
Figure 2:
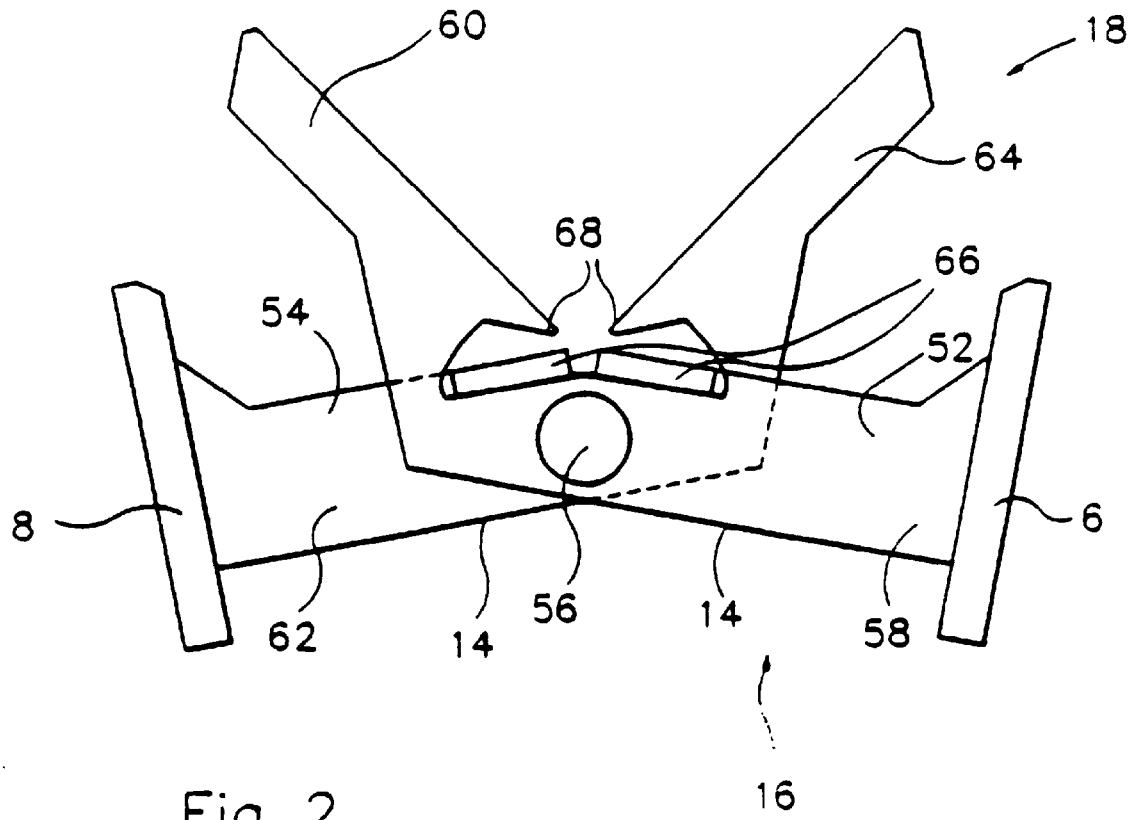
FIG. 2 is a schematic side view of the clamp of the present invention in an open position.

A preferred embodiment of the clamp of this invention is illustrated in FIGS. 1 and 2. As clamps operable by buoyancy have not previously been known it will be understood that such a clamp could take on a number of configurations and the configuration shown in FIGS. 1 and 2 is purely by way of example. In FIG. 2, the clamp is shown as being made up of two levers 52, 54 which are pivotally attached to each other at a fulcrum 56. For some applications it may be desirable for the levers 52, 54, to be formed in two parts 58, 62 and 60, 64 on either side of the fulcrum, the first parts 58, 62 being buoyant and performing the clamping function and the second parts 60 and 64 performing an auxiliary function. In the open position shown in FIG. 2, gripping members 66 are spaced apart from each other. The second parts 60, 64 conveniently form, in the open position, a pathway to guide an object to be clamped into the space between the gripping members 66. The second parts of 60, 64 therefore act as guide members. The clamp is buoyant so it will float on the top of a liquid in the position shown in FIG. 2.

When the clamp is forced downwards into the liquid the tendency for the buoyant first parts 58, 62 of the levers 52, 54 is to move in an upward direction until they reach the limit of upward movement which is defined by the gripping members being pressed together on either side of the object to be gripped (or pressed against each other if no object is present).

Upon return to the surface of the liquid the clamp will again assume an open position.

The clamp may of course be configured so that it clamps when floating and releases when submerged. This may most conveniently be achieved by the gripping members being located on the second parts 60, 64 of the levers 52, 54. Alternatively, the gripping members could be located on the under side of the first parts 58, 62 of the levers 52, 54. As mentioned above, the clamp's configuration is not limited to the example shown in FIGS. 1 and 2 but can be configured to suit the overall function it performs in whatever apparatus it may be utilised in.

One particularly appropriate use of the clamp of the invention is, however, as part of a cathode shield in an electroplating bath where the clamps hold electroplatable substrates in place and is advantageous in that very flexible substrates can be securely retained in the electroplating bath.

Figure 3:
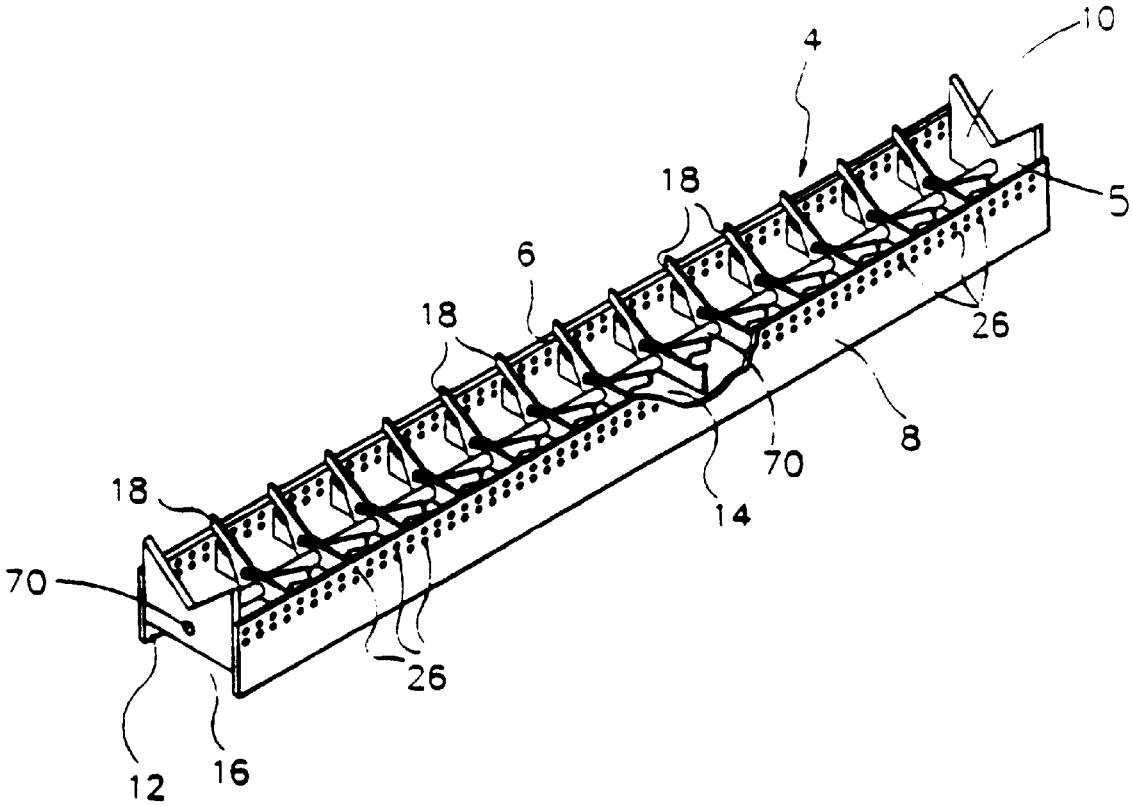
FIG. 3 shows in perspective view, partially cutaway, a cathode shield of the present invention.

FIG. 3 shows a perspective view, with one side partially cutaway to show details of the interior, of a shielding device shown overall as 4 according to a preferred embodiment of the invention. The shield 4 comprises an elongated trough 5 bounded by sidewalls 6 and 8, and strut engaging members 10 and 12 and a floor 14. It will be understood that the strut engaging members 10, 12 need not be positioned at the ends of the trough but are most suitably so placed. The floor 14 is raised above the level of the lower edges of the sidewalls 6 and 8 thus leaving an open compartment 16 beneath the floor 14 of the shield. Disposed within the shield are a plurality of clamps 18 which serve to secure the substrates which are to be electroplated. The lower edge of a substrate 24 is received as shown in cross-section in FIG. [3] *4*. As shown in FIG. 3, the gripping members are below the level of the upper edge of walls 6 and 8 by a distance "x". In general, the distance "x" is within the range of about 2 cms to about 10 cms and preferably in the range of about 3 cms to about 6 cms although values of "x" higher than or lower than this can be employed if desired. Preferably, however, the distance "x" is not less than about 1.5 cms.

Figure 8:
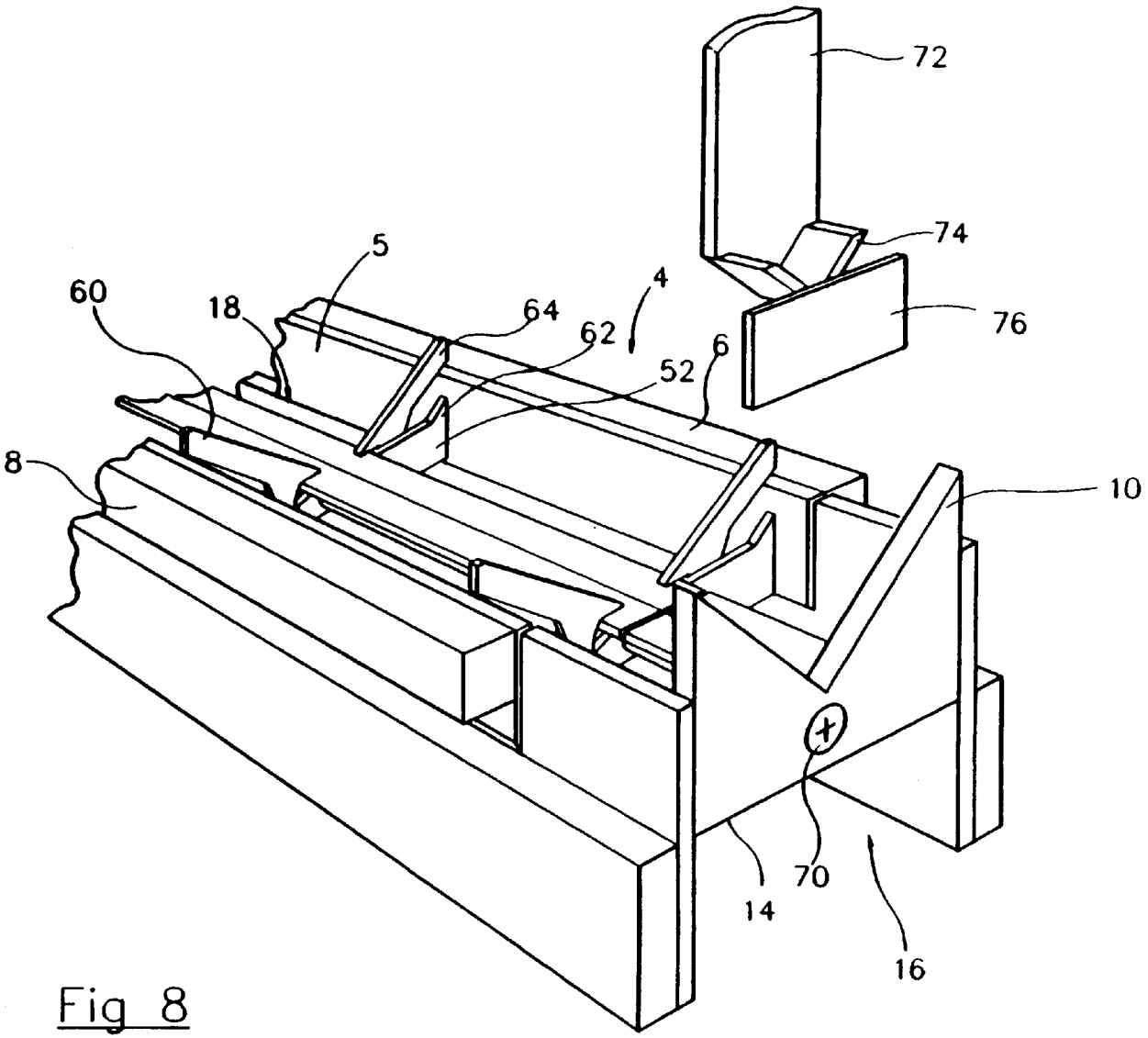
FIG. 8 is a perspective view of a cathode shield of the present invention showing one end of the shield in detail.

The clamps 18 all pivot about a rod 70 which is secured at either end by the strut engaging members 10, 12 or in some other way so that the clamps may pivot freely. For convenience the entire of side walls 6, 8 need not be attached to the levers 52, 54, but can be formed in two parts as shown in FIG. 8. The lower part of the side walls 6, 8 will therefore [be] remain substantially vertical at all times, whereas as the upper part will be at an angle to the lower part when the trough is floating on top of the bath.

Figure 4:
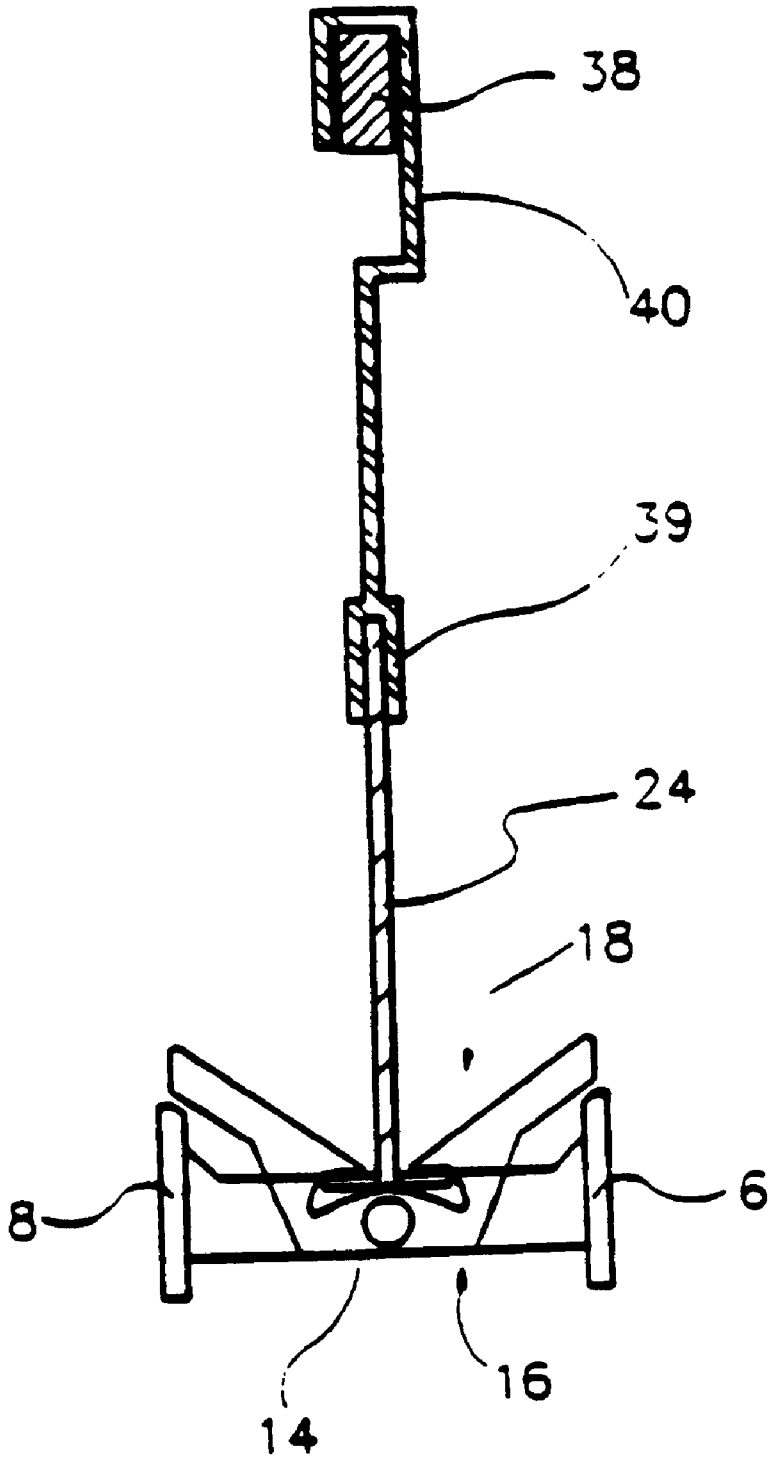
FIG. 4 is a cross-sectional view of a cathode shield incorporating the clamp and with an electroplatable substrate in place.

Referring again to FIG. 3, each of the sidewalls 6 and 8 has a plurality of perforations 26 in the upper regions thereof to permit electrolyte in the bath to flow therethrough into and out of the trough 5. The number and arrangement of these perforations is not critical although it is preferred that no perforations are present in either sidewall below the level the gripping members (see FIG. 4).

In the loaded condition the device 4 is immersed in the bath to the depth required by exerting a downwards pressure on the trough.

Figure 7:
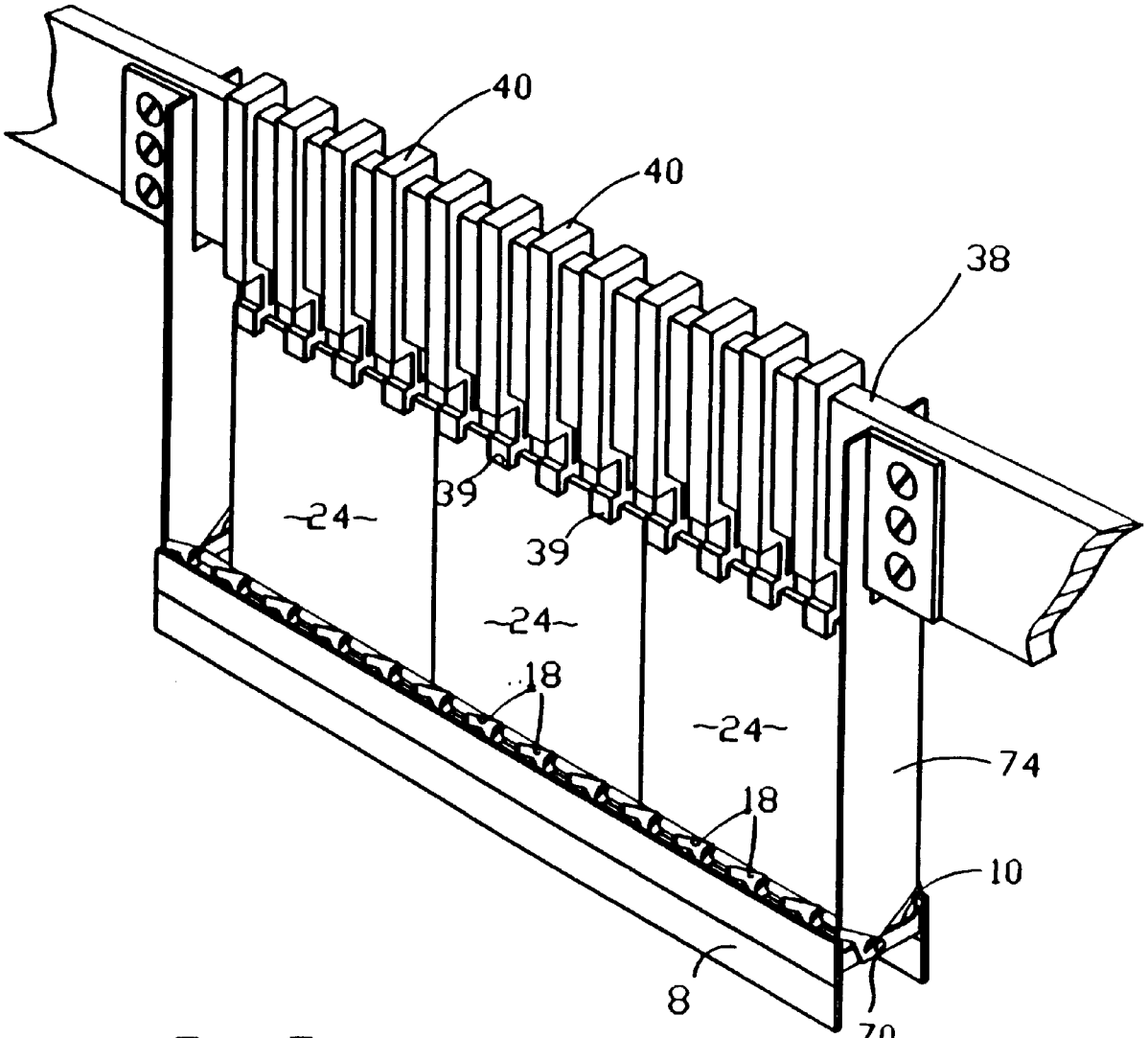
FIG. 7 is a perspective view of the cathode shield of the invention mounted in a frame with electroplatable substrates loaded.

Referring to FIG. 8, a downwards pressure is conveniently exerted on the trough 5 by struts 72 attached to the cathode bus bar 38 (see FIG. 7). The strut 72 has a strut end 74 which engages with a strut engaging member 10. The strut end 74 and strut engaging member 10 are shown as having corresponding V-shapes, but many have other corresponding shapes, such as a tooth arrangement. The strut 74 and the strut engagement member 10 must, however, engage in such a manner so that lateral movement in the strut 72 creates a corresponding lateral movement in the trough 5 and does not cause the strut 72 to became disengaged from the strut engaging member 10. To aid such an engagement, the strut end 74 is preferably provided with a retainer 76 to retain the strut 72 in position relative to the strut engaging member 10. The strut engaging member 10 could be formed by one of the clamps 18 in the trough 5 as illustrated in FIG. 7.

The strut could alternatively extend upwards from the trough and engage with a strut engaging member on the cathode bus bar 38. Or, both the trough and the bus bar could be provided with struts which engage with each other.

Thus, in operating an electroplating process in accordance with the invention, the cathode bus bar 38, with the substrates 24 attached by means of clamp 39 and connecting harness 40 moves into position over the electrolyte bath 30 and the trough 5. The cathode bus bar 38 then lowers the substrates down towards the trough and the guide members (second parts) 60, 64, guide the lower edge of the substrates into the space between the gripping members 66. At the same time the strut 74 engages the strut engaging member 10. The bus bar continues to move downwardly and pushes the trough, via the strut 74 into the electrolyte. As the clamps 18 become submerged the gripping members 66 close on either side of the substrates 24 to hold them in a substantially vertical plane. When electroplating is completed, the cathode bus bar 38 and attached substrates move upwardly and the trough, by virtue of its buoyancy, also moves upwardly. When the trough reaches the top of the electrolyte solution, the clamps 18 open and the gripping members move apart to release the substrates 24. The substrates are then lifted clear of the electrolyte bath and moved away by the cathode bus bar.

The struts 74 are conveniently placed one at each end of the trough 5, however more struts 74 could be provided if desired. If only one strut 74 is utilised the corresponding strut engagement member 10 would need to be exactly centrally placed.

A guide (not shown) may be situated on each side of the bath 30 to prevent gross lateral movement of the trough, but such a guide would obviously allow for the reciprocating motion which is part of the electroplating process as described below.

A feature of the clamp illustrated in FIGS. 1 and 2, is that the guide members 60, 64 which form a steep sided V-shape when the clamp is in the open position, form a very wide V-shape when the clamp is in the closed position.

If the guide members were to retain a steep V-shape after immersion in the electrolyte, they might hinder electroplating by creating a "shadow" on the substrate. However, if the guide members were to retain a wide V-shape, which would not interfere with the electroplating process, they would not so efficiently guide moving substrates into position.

Figure 6:
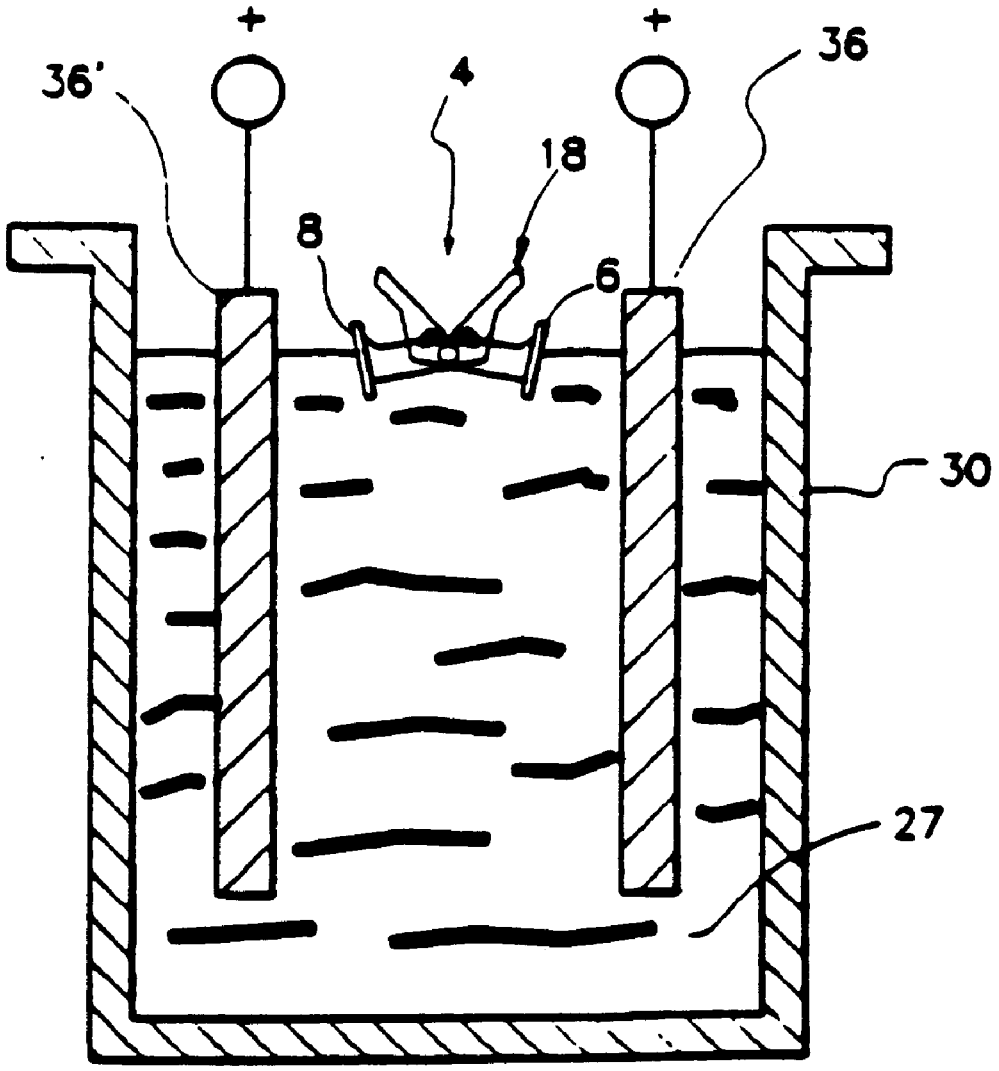
FIG. 6 is a schematic, cross-sectional view of a cathode shield of the invention installed in an unloaded condition in a plating bath.

The components of trough 5 and clamps 18 are advantageously prepared by injection molding or like means as a single unitary whole or in pieces which are assembled by melt sealing or like means from plastic material such as polyethylene, polypropylene and the like which impart sufficient buoyancy to the device 4 to enable it to float in the electrolyte 27 of the plating bath as shown substantially in cross-section in FIG. 6. The components of trough 5 and plates 18 may also be fabricated from plastic material such as polyvinyl chloride which is of a density such that device 4 does not have sufficient buoyancy to float. In this event, material such as a block or blocks of polystyrene foam or polyurethane foam is attached to device 4, advantageously by placement of the appropriate amount of such foam block in compartment 16 (see FIGS. 3, and 4), to impart sufficient buoyancy to the device 4 to enable it to float. The appropriate amount of auxiliary buoyant material required can be determined readily by a process of [trail] *trial* and error.

Figure 5:
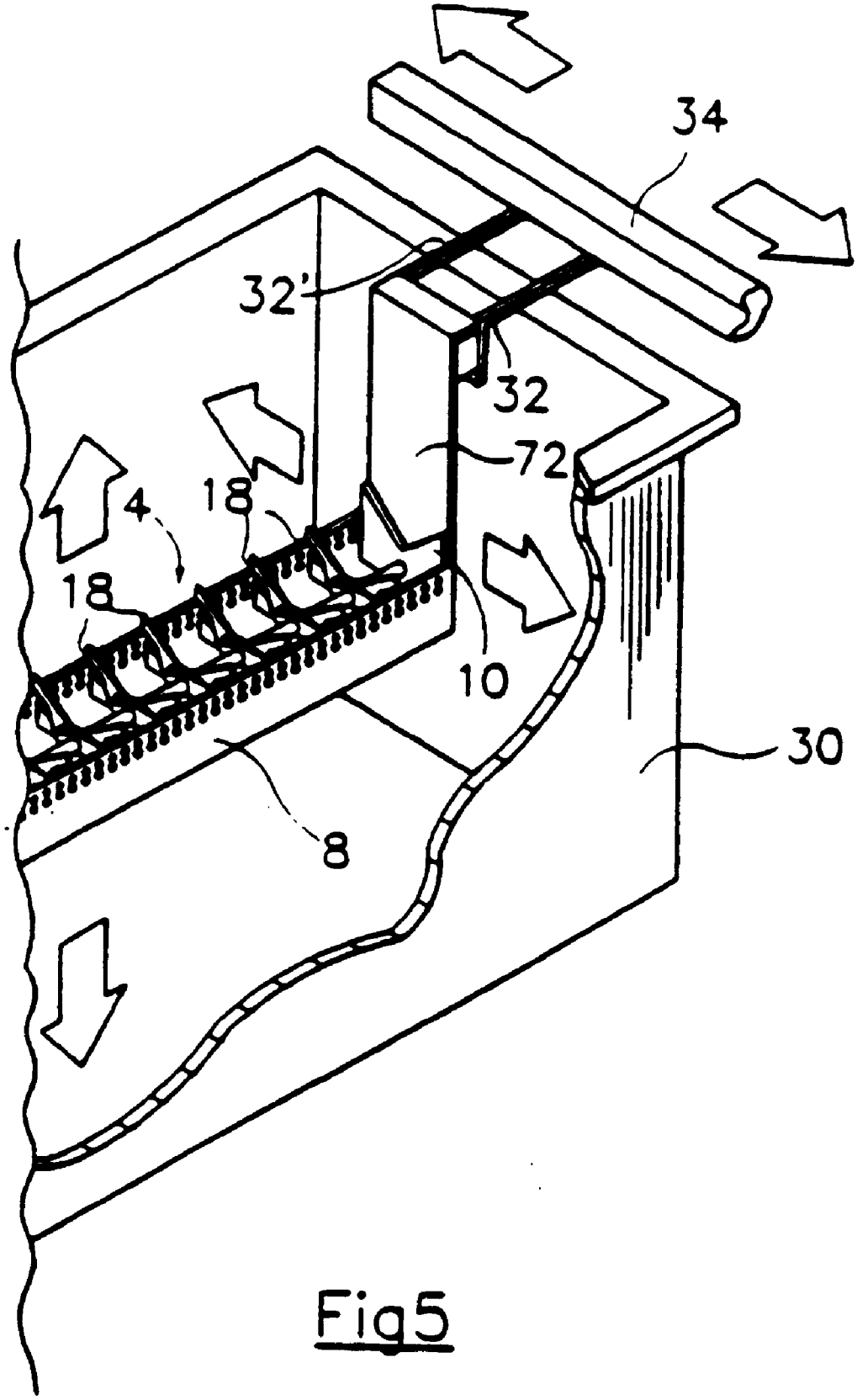
FIG. 5 is a perspective view partially cutaway showing the cathode shield of FIG. 3 mounted in a plating bath.

FIG. 5 shows in partial cutaway a perspective view illustrating another manner in which the device 4 is mounted in a plating bath 30 in accordance with the invention. In this embodiment the strut 72 of device 4 is mounted in the second parts 60, 64 of a clamp 18. The struts 72 are attached to a cathode bus bar 38 (FIG. 7) to which limited reciprocating motion can be imparted in the direction indicated by the arrows by appropriate reciprocating drive means (not shown).

The reciprocating motion imparted to device 4 in the above manner encourages circulation of electrolyte around the substrates suspended in the plating bath. This motion takes place in the gap between twin anodes 36 and 36' shown in cross-section in FIG. 6 which anodes each extend substantially across the width of bath 30 in a direction parallel to the longitudinal axis of device (4). These anodes 36 and 36' are not shown in FIG. 5 in order not to obscure the details of the manner in which the device 4 is mounted in bath 30.

The buoyancy activated clamp, the cathode shielding device using a clamp and using the clamp of the invention and the methods of utilizing said device in an electroplating bath have been described above by reference to various specific embodiments shown in the drawings appended hereto. The scope of the invention is not limited to these particular embodiments, and various modifications which will be readily apparent to those skilled in the art can be made to said illustrative embodiments without departing from the scope thereof.

The invention provides an improved cathode shield device for use in an electroplating bath and process. The device is very easy to load, relatively simple in construction and contributes significantly to the economics of an electroplating operation by reason of the time and labor which is saved by its utilization. Furthermore, the device is particularly useful with very light and flexible substrates which are not sufficiently securely retained during the electroplating process in previously disclosed cathode shields. In addition the buoyancy activated clamp is a significant contribution to the art in that no external clamping means is required. This makes the buoyancy activated clamp particularly useful in automated processes.

I claim:

1. A clamp for use in an electrolytic plating bath, the clamp comprising: [two levers] *at least two opposing levers, at least one lever being* pivotally attached to each other at a fulcrum and movable between an open and a closed position, each lever comprising a first part and a second part, the first part being integrally attached to the second part, the first part comprising a guide member for guiding an object to be clamped, each part being situated on opposite sides of the fulcrum from each other such that rotational movement about the fulcrum between the open position and the closed position causes the second parts of each lever to move from an upper position to a lower position when the clamp is submersed into a liquid[, the clamp further comprising at least two gripping members, at least one griping member being situated on each lever, wherein when the levers are in a closed position the gripping members are adjacent to each other and are on either side of the object to be clamped, and wherein when the levers are in an open position, the gripping members are spaced apart from each other], *said clamp being operable between the open and closed positions by virtue of its buoyancy*.

2. The clamp for use in an electrolytic plating bath of claim 1, wherein when the levers are in the open position, the guide members of each lever guide an object to be clamped into the space between the gripping members.

3. The clamp for use in an electrolytic plating bath of claim [1] *18*, wherein the guide members extend upwardly and outwardly in substantially a v-shape from the space between the gripping members when the levers are in the open position.

4. The clamp for use in an electrolytic plating bath of claim 3, wherein the two guide members form an angle therebetween, wherein the angle between the guide members is smaller when the levers are in the open position than when the levers are in the closed position.

5. A method for electrolytic deposition of a coating of metal on an electroplatable substrate, the substrate having a lower edge, the method comprising the following steps:

supporting at least one substrate in a substantially vertical plane*;* for submersion into an electrolyte bath;

positioning the substrate over the electrolyte bath;

submersing the substrate into the electrolyte bath; and clamping the substrate at its lower edge as the substrate enters the electrolyte bath, wherein the step of clamping the substrate comprises the step of moving a clamp between an open position and a closed position as the substrate is submersed into the electrolyte bath, the clamp comprising at least two levers pivotally attached to each other at a fulcrum, and at least one gripping member located on each lever for gripping the substrate, wherein the clamp, when floating on top of the electrolyte bath is in an open position, but when submersed into the electrolyte bath is caused, by virtue of its buoyancy, to move to a closed position, such that in the open position the gripping members are spaced apart from each other, and such that in the closed position, the gripping members are adjacent to each other and on either side on the substrate so as to grip the substrate with the gripping members.

6. A cathode shielding device for use in an electrolyte plating bath, said device comprising:

an elongated trough in a frame, the trough capable of housing at least one electroplatable substrate in a substantially vertical plane; and

[a] *at least one* clamp disposed in the trough for clamping the electroplatable substrate, [the] *said* clamp comprising *at least* two *opposing* levers*, at least one lever being* pivotally attached to [each other at] a fulcrum and movable between an open and a closed position, each lever comprising a first part and a second part, the first part being integrally attached to the second part, the first part comprising a guide member for guiding an object to be clamped, each part being situated on opposite sides of the fulcrum from each other such that rotational movement about the fulcrum between the open position and the closed position causes the second parts of each lever to move from an upper position to a lower position when the clamp is submersed into the electrolyte plating bath.

7. The cathode shielding device for use in an electrolyte plating bath of claim 6, wherein the clamp further comprises at least two gripping members, at least one [griping] *gripping* member being situated on [each lever] *at least two levers*, wherein when the levers are in a closed position the gripping members are adjacent to each other and are on either side of the object to be clamped, and wherein when the levers are in an open position, the gripping members are spaced apart from each other.

8. The cathode shielding device for use in an electrolyte plating bath of claim 7, wherein the levers are in the open position, the guide members of each lever guide an object to be clamped into the space between the gripping members.

9. The cathode shielding device for use in an electrolyte plating bath of claim 8, wherein the guide members extend upwardly and outwardly in substantially a v-shape from the space between the gripping members when the levers are in the open position.

10. The cathode shielding device for use in an electrolyte plating bath of claim 9, wherein [the two] guide members form an angle therebetween, wherein the angle between the guide members is smaller when the levers are in the open position than when the levers are in the closed position.

11. The cathode shielding device for use in an electrolyte plating bath of claim 10, wherein the substrate comprises a printed circuit board.

12. An apparatus for electrolytic deposition of metal on a substrate, said apparatus comprising a container for containing electrolytic fluid; a cathode and an anode mounted in the container, and a cathode shielding device, the cathode shielding device comprising:

an elongated trough, the trough comprising an upper edge in a plane, the trough capable of housing an electroplatable substrate in a substantially vertical plane, the substrate having a lower edge in a plane, the lower edge of the substrate located in the same plane in which lies the upper edge of the trough; and at least one clamp disposed [inside] *in* the trough for clamping the electroplatable substrate, the clamp comprising [two levers] *at least two opposing levers, at least one lever being* pivotally attached to [each other at] a fulcrum and movable between an open and a closed position, wherein each lever comprises a first part and a second part, the first part being integrally attached to the second part, the first part comprising a guide member for guiding an object to be clamped, each part being situated on opposite sides of the fulcrum from each other such that rotational movement about the fulcrum between the open position and the closed position causes the second parts of each lever to move from an upper position to a lower position when the clamp is submersed into a liquid.

13. The cathode shielding device for use in an electrolyte plating bath of claim 12, wherein the clamp further comprises at least two gripping members, at least one [griping] *gripping* member being situated on [each of lever] *at least two levers*, wherein when the levers are in a closed position the gripping members are adjacent to each other and are on either side of the object to be clamped, and wherein when the levers are in an open position, the gripping members are spaced apart from each other.

14. The cathode shielding device for use in an electrolyte plating bath of claim 13, wherein when the levers are in the open position, the guide members of each lever guide an object to be clamped into the space between the gripping members.

15. The cathode shielding device for use in an electrolyte plating bath of claim 14, wherein the guide members extend upwardly and outwardly in substantially a v-shape from the space between the gripping members when the levers are in the open position.

16. The cathode shielding device for use in an electrolyte plating bath of claim 15, wherein [the two] guide members form an angle therebetween, wherein the angle between the guide members is smaller when the levers are in the open position than when the levers are in the closed position.

17. The cathode shielding device for use in an electrolyte plating bath of claim 12, wherein the substrate comprises a printed circuit board.

*18. The clamp for use in an electrolytic bath according to claim 1 further comprising at least two gripping members, at least one gripping member being situated on at least two levers, wherein when the levers are in a closed position the gripping members are adjacent to each other and are on either side of the object to be clamped, and wherein when the levers are in an open position, the gripping members are spaced apart from each other.*

*19. A clamp for use in an electrolytic plating bath, comprising:*

*at least two opposing gripping members, at least one gripping member being pivotally disposed about a fulcrum so as to be capable of gripping the substrate and movable between opened and closed positions wherein said clamp, when floating on top of the electrolyte bath is in an open position, but when submersed in the electrolytic bath is caused, by virtue of its buoyancy, to move to a closed position, such that in the opened position the gripping members are spaced apart from each other, and such that in the closed position, the gripping members are adjacent to each other and on either side of the substrate so as to grip the substrate with the gripping members.*

*20. The method for electrolyte deposition of a coating of metal on an electroplatable substrate according to claim 5 wherein said clamping step further comprises at least two gripping members, at least one gripping member being situated on at least two levers for gripping the substrate, wherein when the clamp, when floating on top of the electrolytic bath is in an opened position, but when submersed into the electrolytic bath is caused, by virtue of its buoyancy, to move to a closed position, such that in the opened position the gripping members are spaced apart from each other, and such that in the closed position, the gripping members are adjacent to each other and on either side on the substrate so as to grip the substrate with the gripping members.*

*21. A method for electrolytic deposition of a coating of metal on an electroplatable substrate, the substrate having lower edge, the method comprising the following steps:*

*supporting at least one substrate in a substantially vertical plane over an electrolytic bath;*

*submersing the substrate in the electrolytic bath; and*

*clamping the substrate at its lower edge as the substrate enters the electrolytic bath;*

*wherein the step of clamping the substrate comprises moving a clamp between an opened position and a closed position as the substrate is submersed into the electrolytic bath, the clamp comprising at least two opposing gripping members, at least one gripping member being pivotally disposed about a fulcrum so as to be capable of gripping the substrate and movable between opened and closed positions wherein said clamp, when floating on top of the electrolytic bath is in an opened position, but when submersed in the electrolytic bath is caused, by virtue of its buoyancy, to move to a closed position, such that in the opened position the gripping members are spaced apart from each other, and such that in the closed position, the gripping members are adjacent to each other and on either side on the substrate so as to grip the substrate with the gripping members.*

*22. A cathode shielding device for use in an electrolytic plating bath, said device comprising:*

*an elongated trough in a frame, the trough capable of housing at least one electroplatable substrate in a substantially vertical plane; and*

*at least one clamp disposed in said trough for clamping the electroplatable substrate, said clamp comprising at least two opposing gripping members, at least one gripping members being pivotally disposed about a fulcrum so as to be capable of gripping the substrate and movable between opened and closed positions wherein said clamp, when floating on top of the electrolytic bath is in an opened position, but when submersed in the electrolytic bath is caused, by virtue of its buoyancy, to move to a closed position, such that in the opened position the gripping members are spaced apart from each other, and such that in the closed position, the gripping members are adjacent to each*

*other and on either side of the substrate so as to grip the substrate with the gripping members.*

*23. An apparatus for electrolytic deposition of metal on a substrate, said apparatus comprising a container for containing electrolytic fluid; a cathode and an anode mounted in the container, and a cathode shielding device, the cathode shielding device comprising:*

*an elongated trough, the trough comprising an upper edge in a plane, the trough capable of housing an electroplatable substrate in a substantially vertical plane, the substrate having a lower edge in a plane, the lower edge of the substrate located in the same plane in which lies the upper edge of the trough; and*

*at least one clamp disposed in said trough the clamping the electroplatable substrate, the clamp comprising at least two opposing gripping members, at least one gripping member being pivotally disposed about a fulcrum so as to be capable of gripping the substrate and movable between opened and closed positions wherein said clamp, when floating on top of the electrolytic bath is in an opened position, but when submersed in the electrolytic bath is caused, by virtue of its buoyancy, to move to a closed position, such that in the opened position the gripping members are spaced apart from each other, and such that in the closed position the gripping members are adjacent to each other and on either side of the substrate so as to grip the substrate with the gripping members.*

* * * * *